US006643312B2

(12) United States Patent
Kakizaki et al.

(10) Patent No.: US 6,643,312 B2
(45) Date of Patent: Nov. 4, 2003

(54) ARF EXCIMER LASER DEVICE AND A FLUORIDE LASER DEVICE

(75) Inventors: Koji Kakizaki, Mishima (JP); Yoichi Sasaki, Gotenba (JP)

(73) Assignee: Ushiodenki Kabushiki Kaisha, Tokyo (JP)

( * ) Notice: Subject to any disclaimer, the term of this patent is extended or adjusted under 35 U.S.C. 154(b) by 59 days.

(21) Appl. No.: 09/741,079

(22) Filed: Dec. 21, 2000

(65) Prior Publication Data
US 2001/0004371 A1 Jun. 21, 2001

(30) Foreign Application Priority Data

Dec. 21, 1999 (JP) ............................. 11-362688

(51) Int. Cl.[7] ................................ H01S 3/22
(52) U.S. Cl. ................. 372/57; 372/38.02; 372/60; 372/86
(58) Field of Search ............... 372/38.02, 60, 372/89, 57; 307/108

(56) References Cited

U.S. PATENT DOCUMENTS

| 5,708,676 | A | * | 1/1998 | Minamitani | ............... | 372/86 |
| 6,188,144 | B1 | * | 2/2001 | Kawasuji | ............... | 307/108 |
| 6,188,710 | B1 | * | 2/2001 | Besaucele et al. | ............... | 372/60 |
| 6,389,049 | B2 | * | 5/2002 | Yoshida et al. | ............... | 372/38.02 |
| 6,400,741 | B1 | * | 6/2002 | Matsunaga et al. | ............... | 372/38.02 |

FOREIGN PATENT DOCUMENTS

| EP | 1 085 623 | 3/2001 |
| EP | 1 091 462 | 4/2001 |
| JP | 63-110780 | 5/1988 |
| JP | 2001-111142 | 4/2001 |
| JP | 2001-156367 | 6/2001 |

OTHER PUBLICATIONS

Performance Characteristics of Ultra–Narrow ArF Laser For DUV Lithography, Alex Ershov et al., SPIE, vol. 3679, Mar. 1999, pp. 1030–1037.

Mituo Maeda, "Excimer Laser", pp. 62–65, Aug. 20, 1993.

* cited by examiner

Primary Examiner—Paul Ip
Assistant Examiner—Tuan Nguyen
(74) Attorney, Agent, or Firm—Nixon Peabody LLP; David S. Safran

(57) ABSTRACT

An ArF excimer laser device and a fluoride laser device for exposure which is structured so that primary current that infuses energy from a magnetic pulse compression circuit to discharge electrodes via a peaking capacitor overlaps secondary current that infuses energy from the capacitor in the final stage of the magnetic pulse compression circuit to the discharge electrodes, the oscillation cycle of the secondary current is set longer than the oscillation cycle of the primary current, and a pulse of laser oscillation operation is effected by the initial half-cycle of the discharge oscillation current waveform that reverses the polarity of the primary current being overlapped by the secondary current and by at least two half-cycles continuing thereafter, as a result of which a high repetition rate, pulse stretch, line-narrowed ArF excimer laser device and fluorine laser device can be implemented at repetition rate exceeding 2 kHz.

12 Claims, 7 Drawing Sheets

ARF EXCIMER LASER DEVICE AND A FLUORIDE LASER DEVICE

BACKGROUND OF THE INVENTION

1. Field of the Invention

The present invention concerns a gas laser device that emits ultraviolet rays, especially a gas laser device that effects laser operation at long laser pulse width in an ArF excimer laser device and a fluoride laser device.

2. Description of Related Art

Higher resolution is demanded for projection exposure devices for the production of semiconductor integrated circuits as they become smaller and more integrated. Thus, the wavelength of exposure light emitted from an exposure light source becomes shorter, and gas laser devices that emit ultraviolet rays such as ArF excimer laser devices and fluoride laser devices would be effective as the next generation of light sources for semiconductor exposure.

A laser gas comprising a gas mixture of fluorine ($F_2$) gas, argon (Ar) gas and a rare gas, such as neon (Ne), as buffer gas in an ArF excimer laser device or a gas mixture of fluorine ($F_2$) and a rare gas, such as helium (He), as buffer gas in a fluorine laser device serving as the laser medium is excited by discharge within a laser chamber in which the laser gas is enclosed at several hundred kPa.

Since the spectral width of laser light that is emitted in an ArF excimer laser device is broad, at 400 pm, the spectral width must be set at a narrow band range below 1 pm to avoid the problem of color aberration in projection optical systems of exposure devices. The spectral width can be narrowed by disposing a band-restricting optical system comprising an expansion prism and a diffraction grating in a laser resonator.

Incidentally, the core oscillation wavelength in an ArF excimer laser device is 193.3 nm, which is shorter than the 248 nm core oscillation wavelength of a KrF excimer laser device currently used as an exposure light source. Consequently, the damage inflicted on quartz, the glass used in projection lens systems of exposure devices, such as steppers, is greater than that when using a KrF excimer laser device, which shortens the life of the lens system.

Quartz damage may be the formation of color centers, due to two photon absorption, and compaction (elevation of refractive index). The former appears as a decrease of the transmittance while the latter appears as a decrease of the resolution of the lens system. This effect is inversely proportional to the laser pulse width (Ti) defined by the following expression when the laser pulse energy is constant $$T_{is}=(\int T(t)dt)^2/\int(T(t))^2 dt \quad (1)$$

where T(t) represents the periodic laser shape.

This definition of the laser pulse width $T_{is}$ is explained here. Assuming that damage to optical devices arises due to the absorption of two photons, the damage D that accumulates per pulse would be given by the following expression since damage is proportional to the square of the laser photointensity:

$$D=k\cdot\int(P(t))^2 dt \quad (2)$$

where k represents a constant determined by the substance while P(t) is the periodic laser strength (MW).

Laser strength P(t) can be separated into time and energy via the following expression:

$$P(t)=I\cdot T(t)/\int(T(t'))dt' \quad (3)$$

where, I represents energy (mJ) and T(t) represents the periodic laser shape.

I develops when P(t) is periodically integrated, and I would be 5 mJ in the case of an ArF excimer laser device.

Here, damage D would be represented by the following expression when expression (3) is substituted for expression (2):

$$D=k\cdot I^2\cdot\int(T(t)/\int T(t')dt')^2 dt = k\cdot I^2\cdot\int(T(t))^2 dt/(\int T(t)dt)^2$$

When expression (1) is substituted, the result would be as follows:.

$$D=k\cdot I^2/T_{is} \quad (5)$$

Pulse width $T_{is}$, which is inversely proportional to damage D, would be defined by expression (1) since $k\cdot I^2$ (I is held constant) is a constant according to expression (5).

The laser pulse width has been defined in the past by the full-width half maximum (FWHM) of the periodic laser shape. When the laser pulse width is defined by the full-width half maximum, the value would remain the same even if the periodic laser shapes were to mutually differ, as shown by the model in FIG. 8. However, the continuous duration of the actual laser pulse is longer if it is triangular than if it is rectangular in the example shown in FIG. 8. In addition, the triangular shape is longer than the rectangular shape shown in FIG. 8 of the laser pulse width $T_{is}$ defined in expression (1). For example, in the case shown in FIG. 8, the triangular laser pulse width $T_{is}$ is double the rectangular laser pulse width $T_{is}$.

Extension of the laser pulse width $T_{is}$ (pulse stretch) is desirable since the decrease in the transmittance due to the absorption of two photons and the decrease in the resolution due to compaction are inversely proportional to the laser pulse width $T_{is}$ given by expression (1) when the laser pulse energy is constant.

The repetition rate of oscillation operation (hereinafter termed repetition rate) in a commercial, narrowed band range ArF excimer laser device for exposure is 1 kHz and the laser light output is commonly 5 W. Laser pulse width $T_{is}$ should exceed 30 ns to avoid damage to the optical system mounted on a semiconductor exposure device.

As indicated above, pulse stretch that extends laser pulse width $T_{is}$ is sought to reduce damage to the optical system mounted on an exposure device, but this pulse stretch is requested in light of the following points as well.

The resolution R of an image of a mask having a circuit pattern that is projected via a projection lens on a workpiece, such as a wafer having a photoresist applied to it, and the depth of focus DOF in a projection exposure device are represented by the following expressions:

$$R=k_1\cdot\lambda/NA \quad (6)$$

$$DOF=k_2\cdot\lambda/(NA)^2 \quad (7)$$

Here, $k_1$ and $k_2$ represent the coefficients that reflect the resist characteristics, $\lambda$ represents the wavelength of exposure light emitted from the exposure light source and NA represents the numerical apertures.

To enhance resolution R, the wavelength of exposure light is shortened and the number of apertures is raised, as is clear from expression (6); but, the depth of focus DOF is diminished to the extent that these are implemented, as indicated in expression (7). The spectral line width of exposure light must be made narrower since the effects of color aberration are increased as a result. Specifically, still narrower spectral line width of laser light emitted from an ArF excimer laser device is sought.

The fact that the spectral line width of laser light becomes narrower as the laser pulse width is stretched was stated in Proc. SPIE Vol. 3679 (1999) 1030–1037, and experiments by the inventors have corroborated this point. Specifically, further narrowing of the spectral line width of laser light is sought to enhance resolution R, and pulse stretch of the laser pulse width is essential for that.

Laser pulse width $T_{is}$ must be elongated to enhance the resolution and that avoids damage to the optical system of an exposure device, as indicated above. Laser pulse width $T_{is}$ is known to be dependent on the concentration of fluorine gas in the laser gas enclosed in the laser chamber (source: Proc. SPIE Vol. 3679 (1999), 1030–1037), and laser pulse width $T_{is}$ can be stretched so that $T_{is} \geq 30$ ns by adjusting the concentration of fluorine gas.

A method of forming a laser pulse such that $T_{is} \geq 30$ ns was proposed by the inventors in Patent Application No. Hei-11-261628 by carrying out a laser oscillation operation by the initial half-cycle of the discharge oscillation current waveform of a pulse that reverses the polarity and by at least one subsequent half cycle.

Higher resolution, higher throughput, lower damage to quartz are required of ArF excimer laser devices and of fluoride laser devices that are viable candidates for the next generation of semiconductor exposure light sources. However, pulse stretch that has the effects of raising the resolution and lowering the damage, and raising the repetition rate to raise the throughput are incompatible techniques from the perspective of maintaining the stability of discharge characteristics, and compatibility is difficult to realize.

SUMMARY OF THE INVENTION

The present invention was devised in light of the aforementioned problems associated with conventional techniques. The purpose is to provide an ArF excimer laser device and a fluoride laser device for exposure that permits pulse stretch even if the repetition rate should exceed 2 kHz.

To attain aforementioned purpose, an ArF excimer laser device in accordance with the present invention is provided with a pair of laser discharge electrodes disposed in a laser chamber connected to the output terminal of a magnetic pulse compression circuit and a peaking capacitor that is connected in parallel with the pair of laser discharge electrodes, so that primary current that infuses energy from the magnetic pulse compression circuit to the discharge electrodes via the peaking capacitor overlaps secondary current that infuses energy from the capacitor in the final stage of the magnetic pulse compression circuit for charging the peaking capacitor to the discharge electrodes, the oscillation cycle of the secondary current being set longer than the oscillation cycle of aforementioned primary current, and a pulse of laser oscillation operation being effected by the initial half-cycle of the discharge oscillation current waveform that reverses the polarity of aforementioned primary current overlapped by the secondary current and by at least two half-cycles continuing thereafter.

In this case, the magnetic pulse compression circuit is provided with a magnetic pulse compression unit comprising a semiconductor switch, a capacitor having more than one stage and a magnetic switch, the inductance of a circuit loop formed from the peaking capacitor and the main discharge electrodes being 5 to 8 nH, the total gas pressure within the laser chamber being 2.5 to 3.7 atmospheres, the fluorine partial pressure being under 0.1%, the rise time until breakdown of the voltage applied to aforementioned main discharge electrodes develops being 30 to 80 ns, and the relation between the capacitance Cp of the peaking capacitor and the capacitance Cn of the capacitor for charging the peaking capacitor in the final stage of the magnetic pulse compression circuit is 0.45<Cp/Cn<0.75. In this case, the capacitance Cp of the peaking capacitor should be under 10 nF.

In addition, a preionization electrode is disposed near one of the main discharge electrodes, and the capacitance Cc of a preionization capacitor connected in series to the preionization electrode and connected in parallel with the peaking capacitor is 5% or less of the capacitance Cp of the peaking capacitor.

Furthermore, the reflectance of the output mirror of the optical resonator disposed within the laser chamber exceeds 50%.

In addition, the number of round trips of the optical resonator exceeds six.

Still further, the length of the main discharge electrodes is 550 to 750 mm, and the separation between electrodes should be 14 to 18 mm.

The fluoride laser device pursuant to the present invention is provided with a pair of laser discharge electrodes disposed in a laser chamber connected to the output terminal of a magnetic pulse compression circuit and a peaking capacitor that is connected in parallel with aforementioned pair of laser discharge electrodes, and is structured so that primary current that infuses energy from the magnetic pulse compression circuit to the discharge electrodes via the peaking capacitor overlaps secondary current that infuses energy from the capacitor in the final stage of the magnetic pulse compression circuit for charging the peaking capacitor to the discharge electrodes, the oscillation cycle of the secondary current being set longer than the oscillation cycle of the primary current, and a pulse of laser oscillation operation being effected by the initial half-cycle of the discharge oscillation current waveform that reverses the polarity of the primary current overlapped by the secondary current and by at least two half-cycles continuing thereafter.

The present invention is structured so that primary current that infuses energy from the magnetic pulse compression circuit to the discharge electrodes via a peaking capacitor overlaps secondary current that infuses energy from the capacitor for charging the final stage of the peaking capacitor in the magnetic pulse compression circuit to the discharge electrodes, the oscillation cycle of the secondary current being set longer than the oscillation cycle of the primary current, one pulse of laser oscillation operation being effected by the initial half-cycle of the discharge oscillation current waveform that reverses the polarity of the primary current overlapped by the secondary current and by at least two half-cycles continuing thereafter, results in an ArF excimer laser device and a fluoride laser device of high repetition rate, pulse stretch, line-narrowed when the repetition rate exceeds 2 kHz.

The principles and embodiments of the present invention are explained below in greater detail with reference to the accompanying drawings.

DETAILED DESCRIPTION OF THE INVENTION

The inventors developed a long-pulse exposure ArF excimer laser device with a laser pulse width $T_{is}$ greater than or equal to 40 ns that is capable of stable operation even if the repetition rate should exceed 2 kHz by forming a pulse stretch circuit that accommodates high repetition rate operation in a laser discharge circuit to accommodate demands noted above.

The principle in concrete actuation of the pulse stretch circuit is that the rise of primary current flowing through the discharge gap from the peaking capacitor connected in parallel with a pair of laser discharge electrodes disposed within a laser chamber is accelerated, the peak value is raised, the cycle is shortened, discharge continues in a stable manner, and the charge remaining in the capacitor for charging the peaking capacitor of the magnetic pulse compression circuit (portion remaining without transferring to the peaking capacitor until discharge) is combined so as to flow with the second cycle of primary current that flows from the peaking capacitor through the discharge gap. By so doing, laser oscillation operation is effected by the initial half-cycle of the discharge oscillation current waveform, a pulse of which reverses the polarity of the primary current, and by at least two half-cycles continuing thereafter such as is represented by the example of FIG. 1.

Discharge can be maintained in a stable manner by setting the circuit constants (the concrete circuit structure and circuit constants are discussed below) so that the rise of primary current flowing from the peaking capacitor is fast, the peak value is high and the cycle is short.

On the other hand, the circuit constant is set (the concrete circuit structure and circuit constants are discussed below) so that the charge will remain in the capacitor for charging the peaking capacitor of the magnetic pulse compression circuit (final stage capacitor) at the commencement of discharge. The residual charge is set so that the cycle of the secondary current flowing through the discharge gap will be longer (for example, more than three-fold and less than six-fold) than the cycle of the primary current.

Figure 1:
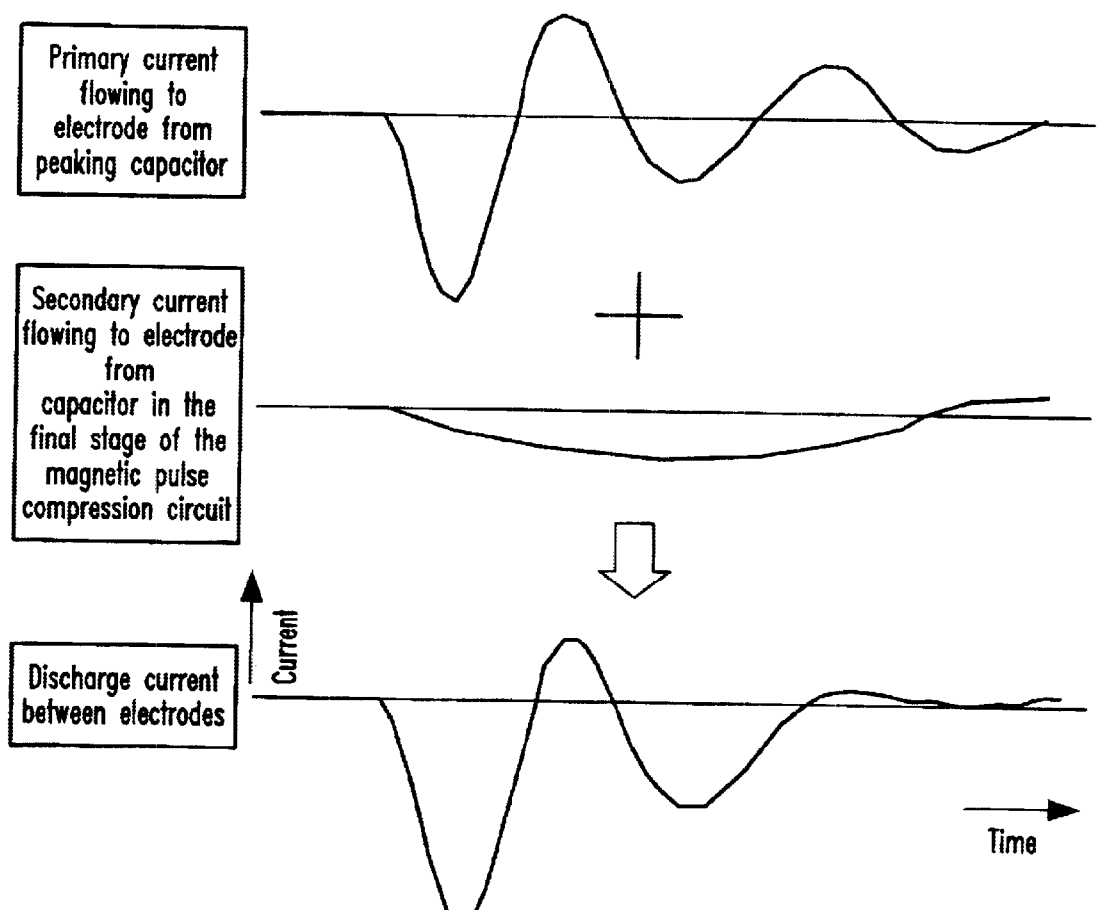
FIG. 1 is a waveform diagram explaining the principles of the ArF excimer laser device based on the present invention.

The primary current and the secondary current of the current flowing between the discharge electrodes overlaps, and as shown in FIG. 1, a pulse of laser oscillation operation is effected by the initial half-cycle of the discharge oscillation current waveform that reverses the polarity of the overlapping current and by at least two half-cycles continuing thereafter.

In a supplementary explanation, the first half-cycle and the third half-cycle of the overlapping oscillation current of FIG. 1 have the same polarity, the current intensifies upon overlapping and the energy infused in the discharge gap during that period increases compared to the conventional case in which there is no secondary current so that the oscillation energy also increases. However, the infused energy decreases since the value of the current conversely decreases during the second half-cycle of oscillation current, but since energy is efficiently infused as discharge continues while the polarity is reversed within the discharge gap following the first half-cycle during this period as well, laser oscillation operation can continue from the first half-cycle through the second half-cycle and on to the third half-cycle.

In this manner, primary current that infuses energy from the magnetic pulse compression circuit to discharge electrodes via a peaking capacitor overlaps secondary current that infuses energy from the capacitor for charging the peaking capacitor in the magnetic pulse compression circuit to discharge electrodes, the oscillation cycle of the secondary current is set longer than the oscillation cycle of the primary current, and a pulse of laser oscillation operation is effected by the initial half-cycle of the discharge oscillation current waveform that reverses the polarity of the primary current overlapped by secondary current and by at least two half-cycles continuing thereafter. Consequently, pulse stretch of $T_{is} \geq 40$ ns becomes possible, the spectral line width is reduced below 0.5 pm (half value), the resolution is enhanced, and the peak optical intensity is reduced by pulse stretch. Accordingly, damage to quartz material can be reduced.

A concrete example of an ArF excimer laser device pursuant to the present invention and of its excitation circuit will now be described.

Figure 2:
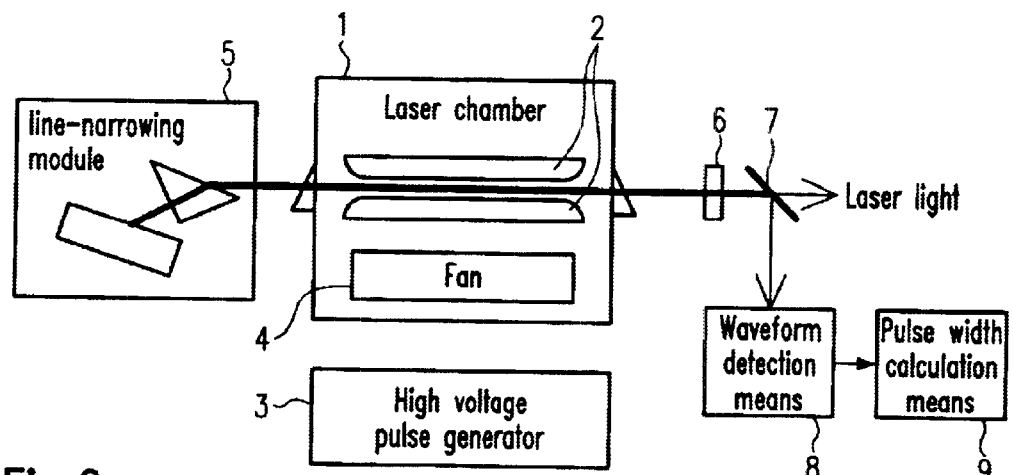
FIG. 2 is diagram showing an embodiment of an ArF excimer laser device in accordance with present invention.

FIG. 2 is a diagram showing the structure of an ArF excimer laser device for exposure pursuant to the present invention. In the diagram, a laser chamber 1 has windows mounted at both ends. A gas mixture comprising fluorine gas, argon gas and a buffer gas (for example, neon gas) is enclosed within chamber 1.

A pair of discharge electrodes 2, 2 face each other separated by a prescribed gap within laser chamber 1. Laser gas that constitutes the laser medium is excited by generation of a discharge between the discharge electrodes 2, 2 following the application of a high voltage pulse from a high voltage pulse generator 3. Laser gas is circulated within laser chamber 1 by a fan 4 that is mounted within laser chamber 1.

Following discharge, the laser gas between two discharge electrodes is replaced by fresh gas before the next discharge occurs through circulation of the laser gas, thereby permitting stable discharge subsequently.

The inventors improved the laser gas circulation structure in laser chamber 1 as well as the shape of fan 4 to attain a repetition rate exceeding 2 kHz.

A line-narrowing module 5, having a narrowing band range optical system to make the spectral width of laser narrower, is mounted at one end of laser chamber 1. Line-narrowing module 5 contains a beam diameter expansion optical system comprising one or more prisms and a retro-situated reflecting diffraction grating. An output mirror 6 is mounted at the other end of laser chamber 1 and a laser resonator is constructed from the output mirror 6 and line-narrowing optical system which is disposed in line-narrowing module 5.

Part of the ArF excimer laser that is emitted from output mirror 6 is retrieved by a beam sampler 7 and is conducted to a waveform detection means 8 that detects the periodic waveform of the laser. Waveform detection means 8 is provided with a photodiode or a photoelectron multiplier tube as a photoelectric conversion means. The waveform data obtained by waveform detection means 8 are fed to a pulse width calculation means 9. Pulse width calculation means 9 calculates the laser pulse width $T_{is}$ in accordance with the above expression (1) based on the pulse width data thus obtained.

Figure 3:
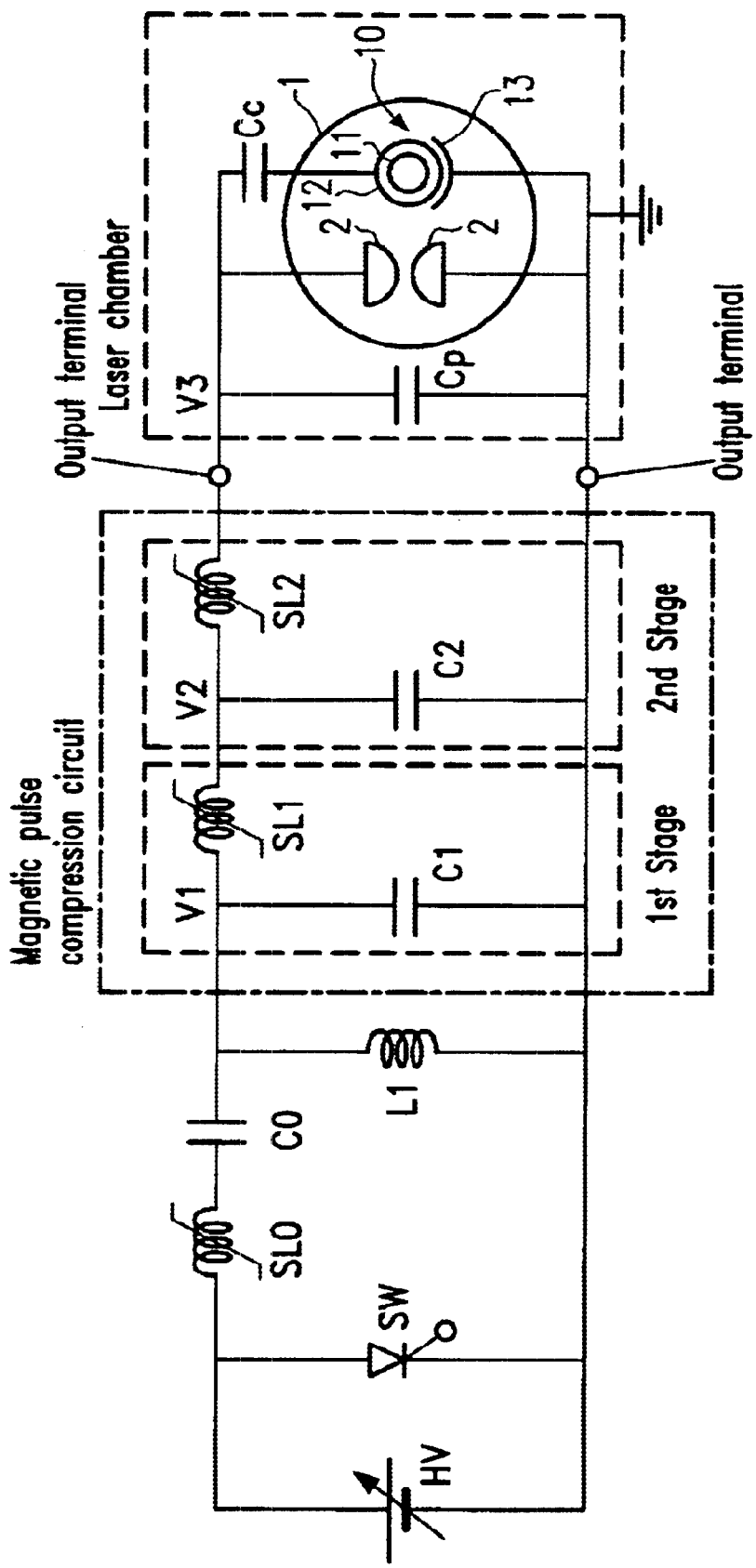
FIG. 3 is circuit diagram showing an embodiment of an excitation circuit in accordance with the present invention.

Main discharge voltage is applied from the excitation circuit shown in FIG. 3 between main discharge electrodes 2, 2 of such an ArF excimer laser device and preliminary discharge voltage is applied via capacitor Cc for preionization between a primary electrode 11 and a secondary electrode 13 of a corona preionization unit 10. In the corona preionization unit 10, in this example, primary electrode 11 comprises a cylindrical electrode inserted within a dielectric tube 12 that is open on one end and is composed of dielectric material, such as high-purity alumina ceramic, and the secondary electrode 13 comprises a flat rectangular electrode. The flat secondary electrode 13 is bent near one straight edge and makes linear contact parallel with the outer surface of dielectric tube 12 of primary electrode 11. The position of contact is disposed near one main discharge electrode 2 at a position where a laser excitation gap can be viewed between main discharge electrodes 2, 2.

The excitation circuit of FIG. 3 comprises a two-stage magnetic pulse compression circuit using three magnetic switches SL0, SL1, SL2 that comprise saturable reactors. Magnetic switch SL0 is for protection of a solid state switch SW. A two-stage magnetic pulse compression circuit is constructed from a first magnetic switch SL1 and second magnetic switch SL2.

The circuit structure and operation are explained below via FIG. 3. First, the voltage of high voltage power source HV is adjusted to a prescribed level and the main capacitor C0 is charged via magnetic switch SL0 and inductance L1. Solid state switch SW is off at this time. When charging of main capacitor C0 is completed and solid state switch SW turns on the voltage applied to both terminals of the solid state switch SW shifts so that said voltage is applied to both terminals of magnetic switch SL0, then solid state switch SW is protected. When the time-integrated value of the charge voltage V0 of the main capacitor C0 applied to both terminals of magnetic switch SL0 reaches the critical value determined by the characteristics of the magnetic switch SL0, the magnetic switch SL0 becomes saturated and is thrown, and current flows through the loop comprising main capacitor C0, magnetic switch SL0, solid state switch SW, and capacitor C1. The charge accumulated in the main capacitor C0 transfers and first capacitor C1 is charged.

Subsequently, when the time-integrated value of charge voltage V1 of the main capacitor C1 reaches the critical value determined by the characteristics of the magnetic switch SL1, the magnetic switch SL1 becomes saturated, the magnetic switch is thrown, and current flows through the loop comprising capacitor C1, capacitor C2, and magnetic switch SL2. The charge accumulated in capacitor C1 transfers and capacitor C2 is charged.

Then, when the time-integrated value of charge voltage V2 of main capacitor C2 reaches the critical value determined by the characteristics of magnetic switch SL2, the magnetic switch SL2 becomes saturated, the magnetic switch is thrown, and current flows through the loop comprising capacitor C2, peaking capacitor Cp and magnetic switch SL2. The charge accumulated in capacitor C2 shifts and peaking capacitor Cp is charged.

As apparent from FIG. 3, corona discharge for preionization occurs on the outer peripheral surface of the dielectric tube 12 using the location where the dielectric tube 12 and secondary electrode 13 make contact as the reference point, and voltage V3 rises as charging of peaking capacitor Cp proceeds. Corona discharge occurs on the surface of dielectric tube 12 at the site of corona preionization when V3 reaches the prescribed voltage. Ultraviolet rays are generated on the surface of dielectric tube 12 by this corona discharge, and the laser gas, which is the laser medium, undergoes preionization between main discharge electrodes 2, 2.

As charging of peaking capacitor Cp proceeds further, voltage V3 of peaking capacitor Cp rises and laser gas between the main discharge electrodes 2, 2 undergoes insulation breakdown when voltage V3 reaches a given value (breakdown voltage), leading to commencement of main discharge, excitation of the laser medium by this main discharge and the generation of laser. After that the voltage of peaking capacitor Cp rapidly decreases by the main discharge, then the peaking capacitor becomes a ground level.

Pulse laser oscillation takes place at a prescribed repetition rate by repeating such discharge operation through switching operation of solid state switch SW.

Here, the inductance in each stage of a capacitor-transfer circuit comprising magnetic switches SL1, SL2, and capacitors C1, C2 is set to decrease in subsequent stages, as a result of which a pulse compression operation is carried out in which the pulse width of the current pulse flowing through each stage becomes sequentially narrower. Strong short-pulse discharge is thus carried out between main discharge electrodes 2, 2.

Incidentally, the required discharge volume is naturally determined from the laser output energy required for exposure in the case of using an ArF excimer laser device as the light source for semiconductor exposure. The separation of main discharge electrodes 2, 2 must be 14 to 18 mm and their length must be 550 to 750 mm because of this discharge volume.

Generally, the laser output energy is determined by the capacitance of peaking capacitor Cp (the input energy due to discharge is $\frac{1}{2} \times Cp \cdot Vb^2$), and while a larger Cp is preferable, the value of Cp must be reduced to shorten the cycle of current flowing from peaking capacitor Cp to main discharge electrodes 2, 2. Furthermore, Cp cannot be made too large for a charge to remain in C2 even if current flows from Cp between main discharge electrodes 2, 2, as explained in connection with FIG. 1. In light of these conditions, the capacitance of peaking capacitor Cp must be under 10 nF.

Here, the circuit constant must be set, in accordance with the present invention, so that the rise of current flowing from peaking capacitor Cp to main discharge electrodes 2, 2 is fast and so that the peak current is high, as explained above. The voltage applied to main discharge electrodes 2, 2 must be set to rapidly rise in order to increase the peak current since the voltage (breakdown voltage) Vb when discharge commences at main discharge electrodes 2, 2 is dependent on the rise of voltage applied to main discharge electrodes 2, 2, and since the discharge commencement voltage Vb rises (generation of overvoltage) when the rise time is rapid. The rise time until breakdown of the voltage applied to main discharge electrodes 2, 2 occurs must be in the range of 30 to 80 ns. The section where the rise of the initial ½ cycle of voltage V3 applied to main discharge electrodes 2, 2 is steepest approaches a straight line, and the time from the intersection of that straight line with the straight line of voltage 0 until breakdown voltage Vb is reached defines the rise time until breakdown voltage Vb. Here, adequate time for preionization electrode cannot be taken if the rise time is shorter than 30 ns. Conversely, the laser pulse width that is output decreases and the desired pulse width exceeding 40 ns cannot be attained if the rise time is longer than 80 ns.

Since the residual inductance of magnetic switch SL2 is determined by the definition of the rise time until breakdown of the voltage applied to the main discharge electrodes 2, 2, the inductance that determines the cycle of the current flowing in the loop comprising capacitor C2, magnetic switch SL2 and main discharge electrodes 2, 2 (current flowing from capacitor C2 to the discharge gap in FIG. 1) is determined by this definition.

The following structure is adopted to shorten the cycle of current flowing from peaking capacitor Cp to main discharge electrodes 2, 2 and to facilitate stable continuation of discharge. Specifically, the capacitance of the loop (discharge current circuit) formed by peaking capacitor Cp and main discharge electrodes 2, 2 in the excitation circuit shown in FIG. 3 and the floating inductance, and the route of the product of the two is proportional to the cycle. Accordingly, the floating inductance of the discharge current circuit must be shortened whenever possible to shorten that cycle. However, since the value of the floating inductance is determined by the cross-sectional area of the laser cavity, it cannot be smaller than 4 to 8 nH in practice.

Furthermore, the electrical resistance of laser gas must be decreased in order to increase the peak current of ½ cycle from the second oscillation current onward flowing through main discharge electrodes 2, 2 and to carry out laser oscillation even at a ½ cycle from the second onward. The fluorine partial pressure relative to the total laser gas pressure should be under 0.1% since the electrical resistance of laser gas decreases as the fluorine partial pressure decreases when 2.5 to 3.7 atm of a laser gas comprising $Ar+F_2+Ne$ are used in ArF. The energy that can be infused becomes too low, thereby precluding the attainment of the output energy required by the exposure device when the laser gas pressure falls below 2.5 atmospheres, while the resistance becomes too great and the conduct of laser oscillation at ½ cycle from the second onward becomes difficult when the pressure exceeds 3.7 atmospheres.

Figure 4:
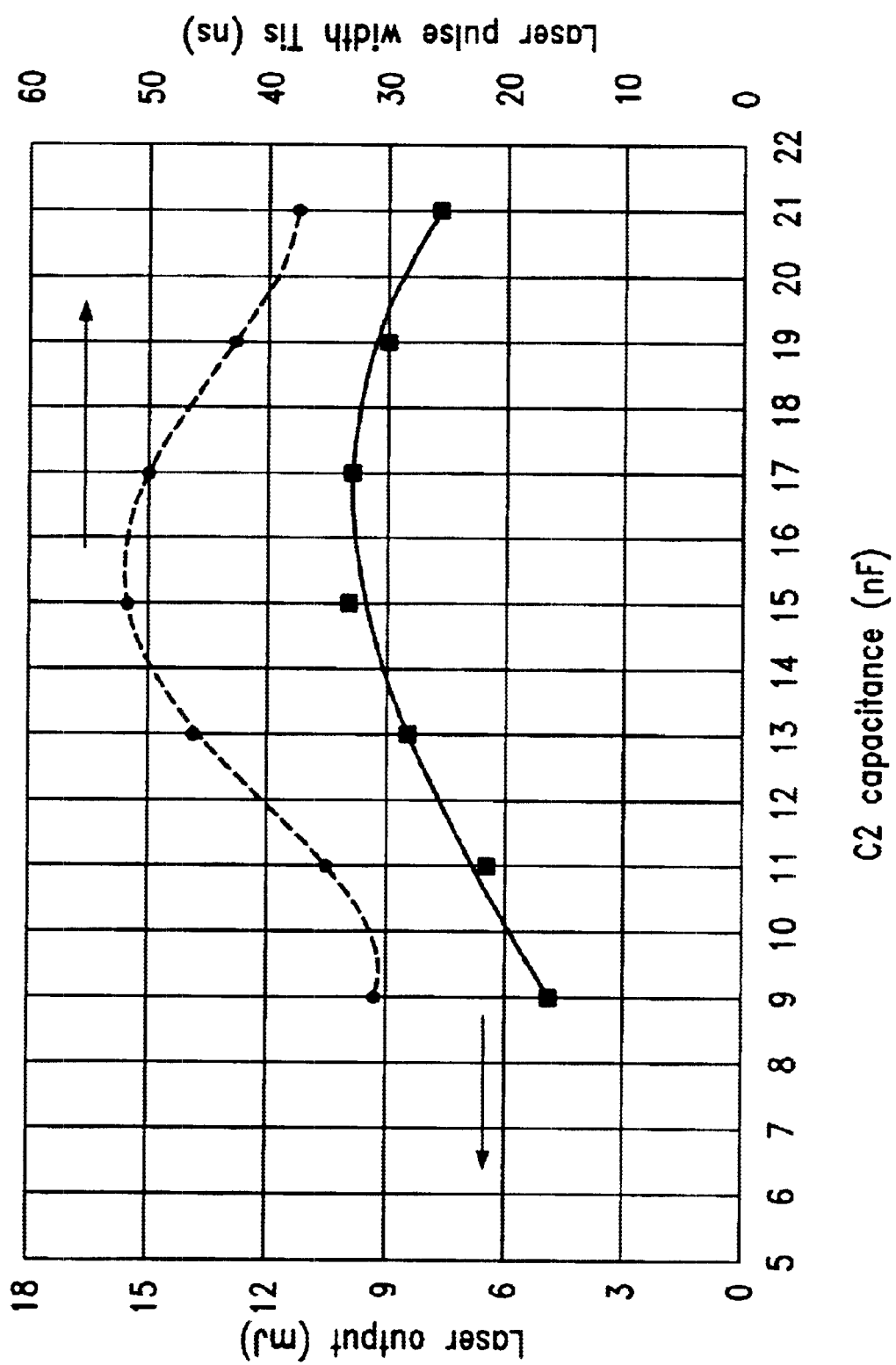
FIG. 4 is a graph showing the results of examining the relationship between laser pulse width and laser output energy per pulse by altering the capacitance of the capacitor in the final stage of the magnetic pulse compression circuit.

Based on such findings, examination of the relation between laser pulse width $T_{is}$ and the laser output energy per pulse when laser oscillation is effected based on the principles of FIG. 1 in the ArF excimer laser device shown in FIG. 2, taking the length of laser discharge electrodes as 600 mm, the gap as 16 mm, the pressure within laser chamber 1 as 3.5 atmosphere (about 350 kPa), the fluorine concentration as 0.09%, the buffer gas as neon, the repetition rate as 2 kHz based on the excitation circuit comprising the two-stage magnetic pulse compression circuit shown in FIG. 3, the rise time until breakdown as 50 to 60 ns, the capacitance of the preionization capacitor Cc as 0.4 nF, the reflectance of output mirror 6 as 60%, Cp capacitance as 9 nF and C2 capacitance as variable, produces the results shown in FIG. 4. The changes of C2 are set as C2≈C1≈C0. In addition, the pressure within laser chamber 1 is the value converted to gas temperature of 25° C.

The results of FIG. 4 indicate that the laser pulse width $T_{is}$ can be set at a value of $T_{is} \geq 40$ ns when C2 exceeds 12 nF (Cp/C2=0.75) and is under 20 nF (Cp/C0=0.45). Conversely, $T_{is}<40$ ns when C2 is under 12 nF or over 20 nF. In addition, the laser output energy also decreases if C2 is under 12 nF or over 20 nF. The reason is that the energy infused from C2 to the discharge gap decreases when C2 is under 12 nF (Cp/C2>0.75), as a result of which $T_{is}$ and the laser output energy both decrease. Conversely, the energy infused to the discharge gap becomes excessive and discharge becomes unstable when C2 exceeds 20 nF (Cp/C2<0.45), as a result of which $T_{is}$ and the laser output energy both begin to decrease.

FIG. 4 presents the results when the Cp capacitance is 9 nF. The ratio between Cp and Cn must be set in a range of 0.45<Cp/Cn<0.75 to attain $T_{is} \geq 40$ ns since the relation between the cycle of the primary current and the cycle of the secondary current in FIG. 1 does not change even if the range of C2 is altered as a function of the decrease in laser output even if the Cp value has decreased. Here, Cn represents the capacitance of the capacitor (here, capacitor C2) in the final stage of the magnetic pulse compression circuit.

Figure 5:
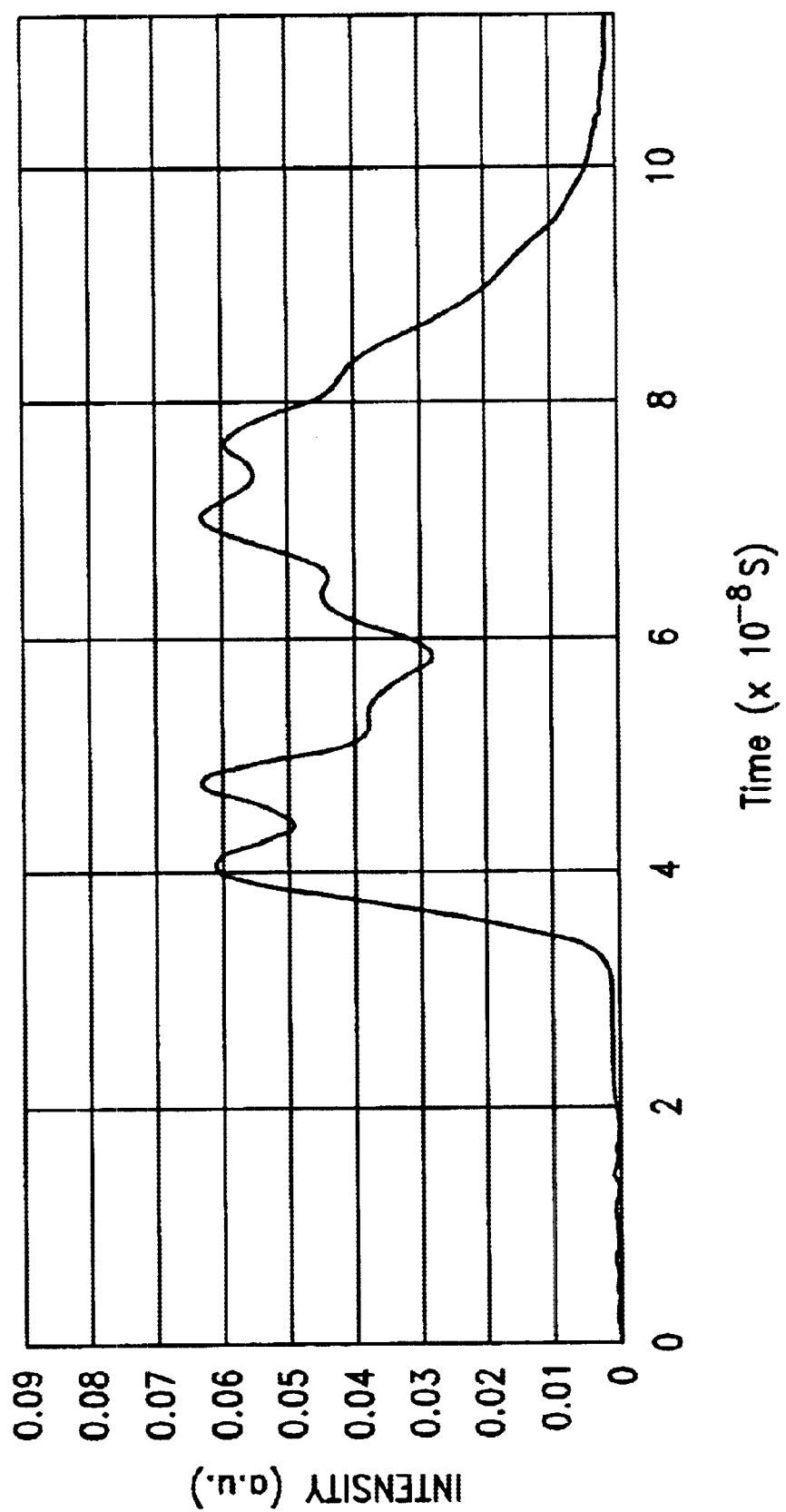
FIG. 5 is a graph showing an example of laser output waveform data obtained from an ArF excimer laser device.

FIG. 5 shows the waveform data that is the periodic laser shape obtained by waveform detection means 8 when C2=15 nF (Cp/C2 0.6) under aforementioned conditions. At this time, the value of the laser pulse width $T_{is}$ determined by pulse width calculation means 9 would be 52 ns.

Figure 6:
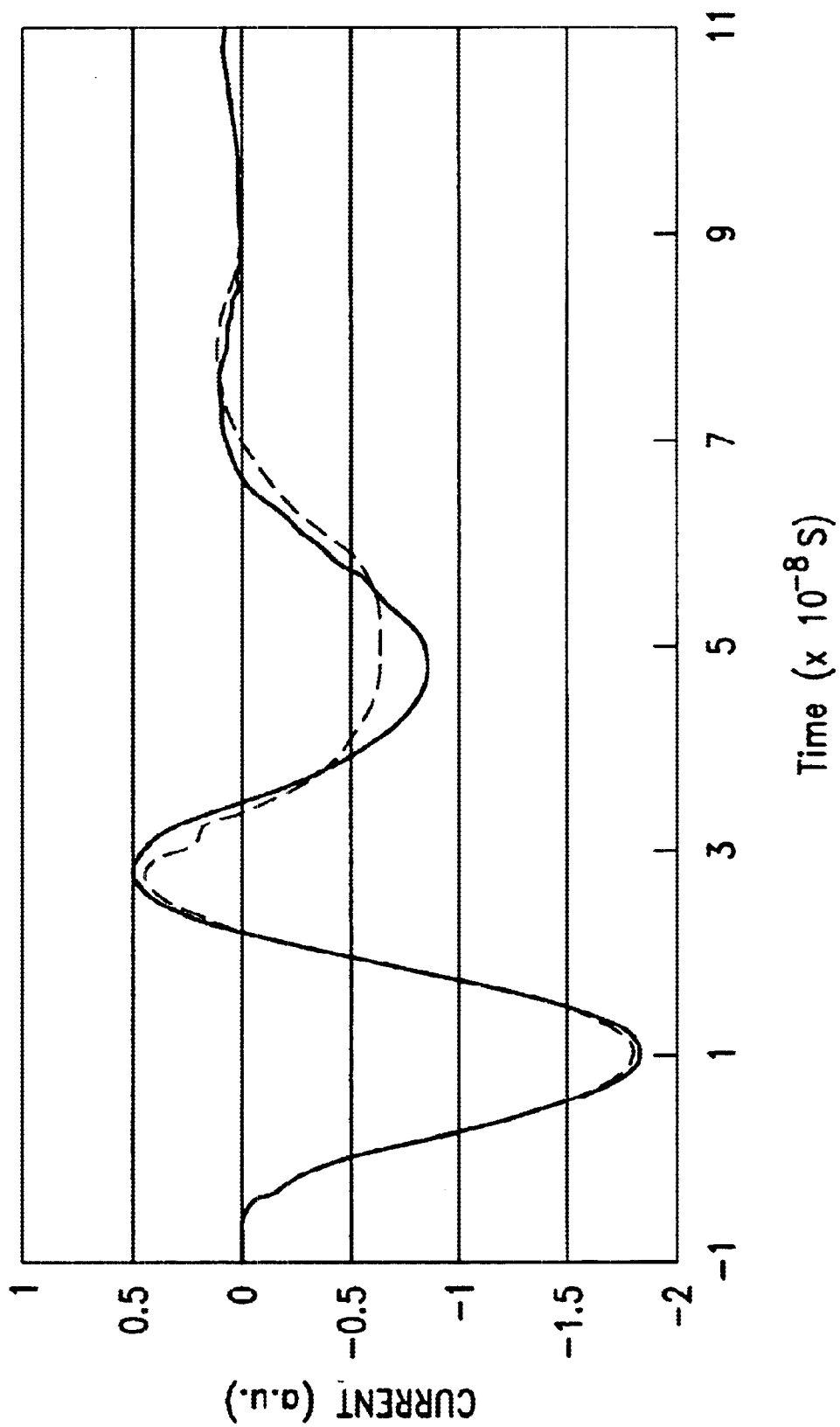
FIG. 6 is a graph showing the waveform of current flowing between discharge electrodes under the conditions of FIG. 5.

FIG. 6 shows the current waveform (preionization capacitor Cc=0.4 nF: solid line) flowing between electrodes under the conditions of FIG. 5.

$T_{is}>40$ ns can be realized by satisfying the following conditions, as clarified by the aforementioned embodiment:

(1) The cycle of current flowing through the discharge gap ($\propto \sqrt{(Cp \cdot Ld)}$) is shortened by making Cp less than 10 nF and by setting the inductance Ld of the discharge loop at only 4 to 8 nH.

(2) The voltage at which discharge commences is raised and the current peak is enlarged by using a rapidly rising power source having a rise time of 30 to 80 ns.

(3) The inductance between Cp and C2 (residual inductance of magnetic switch SL2) is decreased greatly by using the aforementioned fast-rising power source and the current due to the charge remaining in C2 is circulated overlapping the second cycle of current flowing from Cp.

Consequently, pulse stretch oscillation can be efficiently carried out since the stable continuity of discharge is raised due to (1) and (2) and since energy is infused pursuant to (3) during continuation.

At this time, the current flowing from Cp, C2 after the second cycle can be obstructed by shifting the phase when current due to the charge remaining in Cc flows through the discharge gap once preionization capacitor Cc is set greater than 0.8 nF, as shown by the broken line in FIG. 6. Accordingly, Cc should be set at the minimum value necessary for preionization discharge. The results of experiments indicate that setting it at less than 5% of Cp would be desirable. Cc/Cp=0.4 nF/9 nF (4.4%) was set in aforementioned embodiment.

Incidentally, the round trip number (reciprocating frequency of laser light in optical resonator) increases in the long pulse waveform of $T_{is}>40$ ns. Accordingly, when the reflectance of output mirror 6 of the optical resonator is raised to more than 50%, the proportion of round trips from the second onward increases, the laser output increases, the stability of the laser pulse waveform rises and the stability of pulse to pulse energy is also enhanced. An output mirror having a 60% reflectance was used in aforementioned embodiment.

In addition, the peak interval time of the output waveform corresponding to round trips is the result after dividing double the resonator length by the speed of light. Accordingly, the peak number increases as the number of round trips increases at $T_{is}>40$ ns. The length of the resonator must be shortened to relatively increase the round trip number. The length outside of the gain range decreases and the loss is reduced by shortening the length of the resonator and increasing the round trip number if the electrode length (gain range) is constant, which is desirable. $T_{is}>40$ ns is attained in aforementioned embodiment when the round trip number is six or more.

As indicated above, the present invention uses a new technique that differs from the conventional technique of adjusting the fluorine concentration in a laser chamber. It thereby succeeds in implementing a high repetition rate, pulse stretch, narrowed band range ArF excimer laser device in which the repetition rate exceeds 2 kHz and the laser pulse width $T_{is}$ exceeds 40 ns through the novel technique of a pulse stretch discharge circuit (pulse forming circuit).

A high repetition rate, pulse stretch, narrowed band range ArF excimer laser device in which the laser pulse width $T_{is}$ exceeds 40 ns when the repetition rate exceeds 2 kHz can be implemented by setting the capacitance of the peaking capacitor Cp and the capacitance Cn of the capacitor in the final stage of the magnetic pulse compression circuit for charging of the peaking capacitor so that $0.45<Cp/Cn<0.75$ based on the invention.

Figure 7:
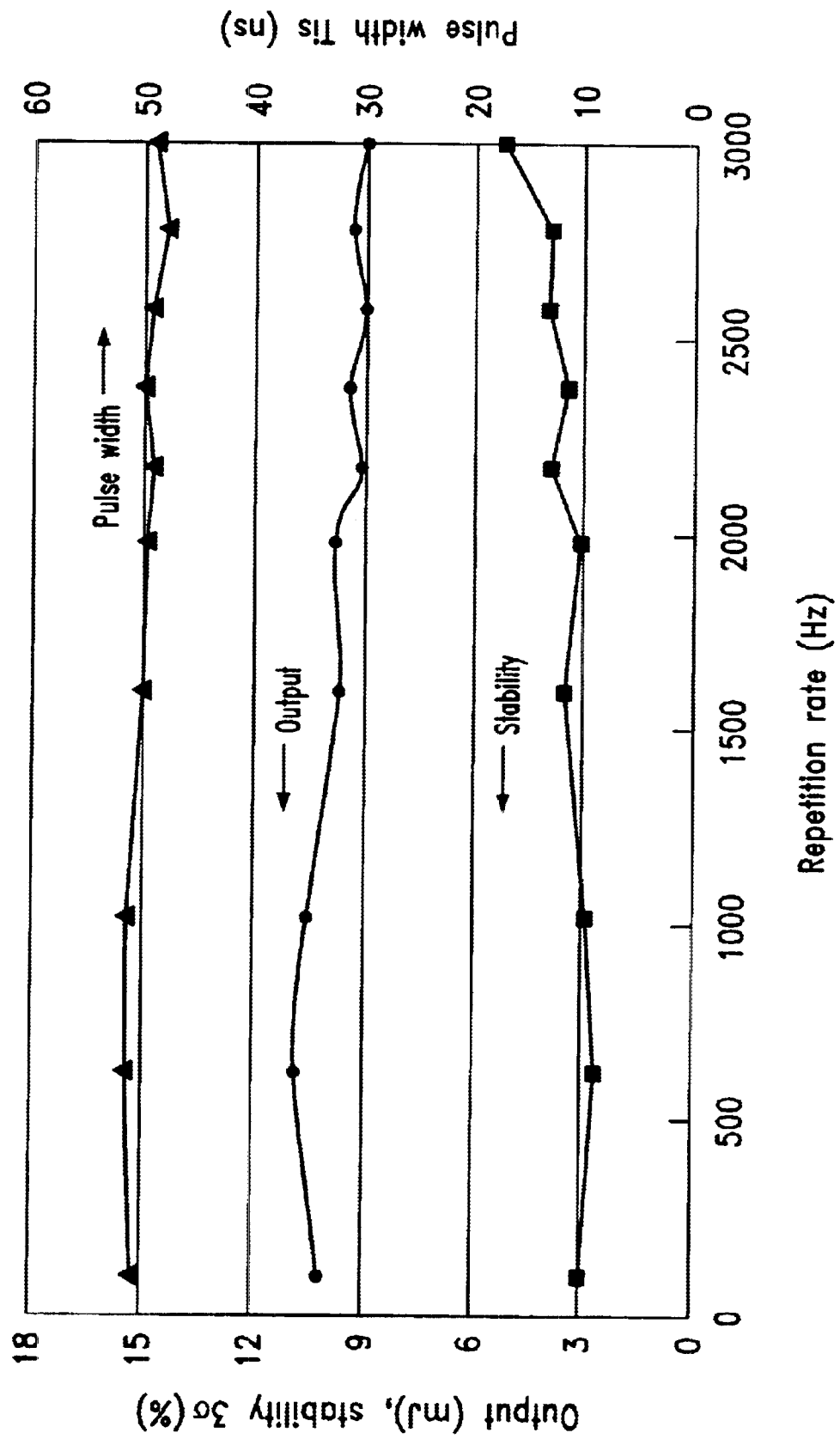
FIG. 7 is a graph showing the laser output, laser pulse width, and output stability when operating the ArF excimer laser device of the present invention up to 3 kHz.
Figure 8:
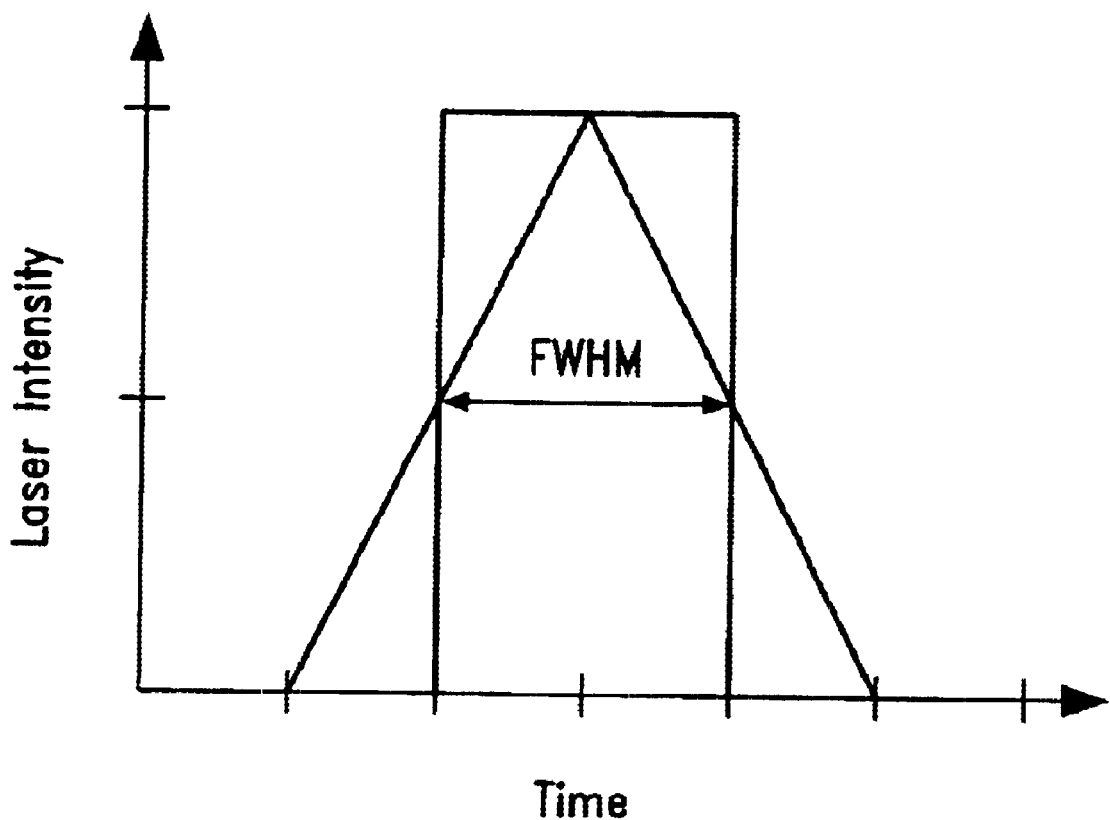
FIG. 8 is a diagram for explaining the laser pulse width.

FIG. 7 shows the laser output energy, laser pulse width ($T_{is}$) and output energy stability ($3\sigma$) when the ArF excimer laser device pursuant to the present invention is operated to 3 kHz. This indicates that $T_{is}>40$ ns can be reliably obtained up to 3 kHz by the present invention. It also indicates that the output energy stability $3\sigma$ is within 5%, independently of pulse width expansion, and that constant high stability can be obtained upon oscillation at the usual pulse width.

An ArF excimer laser device was explained above, but the above-described basic principles can also be applied to similar discharge excitation fluorine laser devices using a gaseous mixture comprising fluorine ($F_2$) and a rare gas, such as helium (He), buffer gas as the laser gas.

The principles of an ArF excimer laser device and a fluorine laser device pursuant to the present invention were explained above based on particular embodiments, but the present invention is not restricted to these embodiments and it may be subjected to various modifications.

Effects of Invention

As explained above, the present invention provides an ArF excimer laser device and a fluoride laser device for exposure which is structured so that primary current that infuses energy from a magnetic pulse compression circuit to discharge electrodes via a peaking capacitor overlaps secondary current that infuses energy from the capacitor in the final stage of the magnetic pulse compression circuit for charging the peaking capacitor to the discharge electrodes, the oscillation cycle of the secondary current is set longer than the oscillation cycle of the primary current, and a pulse of laser operation is effected by the initial half-cycle of the discharge oscillation current waveform that reverses the polarity of the primary current being overlapped by the secondary current and by at least two half-cycles continuing thereafter, as a result of which a high repetition rate, pulse stretch, line-narrowed ArF excimer laser device and fluorine laser device can be implemented at repetition rate exceeding 2 kHz.

What is claimed is:

1. An ArF excimer laser device comprising:
   a laser chamber;
   a magnetic pulse compression circuit having an output terminal;
   a pair of laser discharge electrodes disposed in the laser chamber connected to the output terminal of the magnetic pulse compression circuit; and
   a peaking capacitor that is connected in parallel with said pair of laser discharge electrodes;
   wherein said device further comprises a means to provide a primary current that infuses energy from the magnetic pulse compression circuit to the discharge electrodes via the peaking capacitor overlaps a secondary current that infuses energy from a capacitor in the final stage of the magnetic pulse compression circuit for charging the peaking capacitor to the discharge electrodes, an oscillation cycle of the secondary current being longer than an oscillation cycle of the primary current; and wherein a pulse of laser operation is effected by an initial half-cycle of the discharge oscillation current waveform that reverses the polarity of the primary current being overlapped by the secondary current and by at least two half-cycles continuing thereafter.

2. The ArF excimer laser device of claim 1, wherein the magnetic pulse compression circuit is provided with a semiconductor switch, and a magnetic pulse compression unit having more than one stage comprising a capacitor and a magnetic switch; wherein the inductance of a circuit loop formed from the peaking capacitor and the main discharge electrodes is 5 to 8 nH, the total gas pressure within the laser chamber is 2.5 to 3.7 atmospheres, a fluorine partial pressure is under 0.1%, and a rise time until breakdown of the voltage applied to the main discharge electrodes develops is 30 to 80 ns, the relation between a capacitance Cp of the peaking capacitor and a capacitance Cn of the capacitor in the final stage of the magnetic pulse compression circuit for charging the peaking capacitor being $0.45<Cp/Cn<0.75$.

3. The ArF excimer laser device of claim 2, wherein the peaking capacitor has a capacitance of under 10 nE.

4. The ArE excimer laser device of claim 3, in which a preionization electrode is disposed near one of the main discharge electrodes, and a capacitance Cc of a preionization capacitor connected in series to the preionization electrode and connected in parallel with the peaking capacitor is 5% or less of the capacitance Cp of the peaking capacitor.

5. The ArF excimer laser device of claim 4, wherein an optical resonator having an output mirror is disposed within the laser chamber; and wherein the output mirror of the optical resonator disposed within the laser chamber has a reflectance which exceeds 50%.

6. The ArF excimer laser device of claim 5, wherein the optical resonator is constructed to produce a number of round trips in excess of six.

7. The ArF excimer laser device of claim 6, wherein the main discharge electrodes have a length of 550 to 750 mm, and have a separation between electrodes of 14 to 18 mm.

8. The ArF excimer laser device of claim 2, in which a preionization electrode is disposed near one of the main discharge electrodes, and a capacitance Cc of a preionization capacitor connected in series to the preionization electrode and connected in parallel with the peaking capacitor is 5% or less of a capacitance Cp of the peaking capacitor.

9. The ArF excimer laser device of claim 2, wherein an optical resonator having an output mirror is disposed within the laser chamber; and wherein the output mirror of the optical resonator disposed within the laser chamber has a reflectance which exceeds 50%.

10. The ArF excimer laser device of claim 2, wherein the optical resonator is constructed to produce a number of round trips in excess of six.

11. The ArF excimer laser device of claim 2, wherein the main discharge electrodes have a length of 550 to 750 mm, and have a separation between electrodes of 14 to 18 mm.

12. A fluorine laser device comprising:

a laser chamber;

a magnetic pulse compression circuit having an output terminal;

a pair of laser discharge electrodes disposed in the laser chamber connected to the output terminal of the magnetic pulse compression circuit; and a peaking capacitor that is connected in parallel with said pair of laser discharge electrodes;

wherein said device further comprises a means to provide a primary current that infuses energy from the magnetic pulse compression circuit to the discharge electrodes via the pealing capacitor overlaps a secondary current that infuses energy from a capacitor in the final stage of the magnetic pulse compression circuit for charging of the peaking capacitor to the discharge electrodes, an oscillation cycle of the secondary current being longer than an oscillation cycle of the primary current; and wherein a pulse of laser pulse width operation is effected by an initial half cycle of the discharge oscillation current waveform that reverses the polarity of the primary current being overlapped by the secondary current and by at least two half-cycles continuing thereafter.

* * * * *